United States Patent [19]

Bell et al.

[11] Patent Number: 4,644,387

[45] Date of Patent: Feb. 17, 1987

[54] PLURAL INPUT TELEVISION RECEIVER HAVING PEAKING CIRCUIT AND CHROMINANCE BAND REJECT FILTER IN A VIDEO SIGNAL CHANNEL

[75] Inventors: Isaac M. Bell, Indianapolis; David E. Hollinden, Bloomington, both of Ind.

[73] Assignee: RCA Corporation, Princeton, N.J.

[21] Appl. No.: 727,091

[22] Filed: Apr. 25, 1985

[51] Int. Cl.⁴ .......................................... H04N 5/445
[52] U.S. Cl. .................................. 358/21 R; 358/22; 358/181
[58] Field of Search ...................... 358/22, 183, 31, 37, 358/38, 21 R, 181, 188

[56] References Cited

U.S. PATENT DOCUMENTS

| | | | |
|---|---|---|---|
| 2,923,767 | 2/1960 | Altes | 358/30 |
| 4,020,501 | 4/1977 | Hillberger et al. | 358/22 |
| 4,167,021 | 9/1979 | Holmes | 358/31 |
| 4,218,698 | 8/1980 | Bart et al. | 358/183 |
| 4,232,330 | 11/1980 | Heitmann | 358/31 |
| 4,365,266 | 12/1982 | Lagoni | 358/37 |
| 4,376,952 | 3/1983 | Troiano | 358/38 |
| 4,460,918 | 7/1984 | Flasza | 358/22 |

OTHER PUBLICATIONS

Color Television Service Data (1984) for RCA Color Television Receiver CTC-131.

Primary Examiner—John W. Shepperd
Attorney, Agent, or Firm—P. J. Rasmussen; P. M. Emanuel; R. H. Kurdyla

[57] ABSTRACT

A television receiver responsive to broadcast television signals in a normal operating mode includes a video channel with high frequency peaking circuits, followed by a wideband display driver to which auxiliary R, G, B color image signals are applied in an auxiliary operating mode of the receiver. A low pass filter restricts the high frequency response of the video channel in the normal mode so that the combination of the high frequency peaking circuits and the wideband display driver does not result in a condition of excessive signal bandwidth and attendant unwanted spurious high frequency signal effects.

9 Claims, 1 Drawing Figure

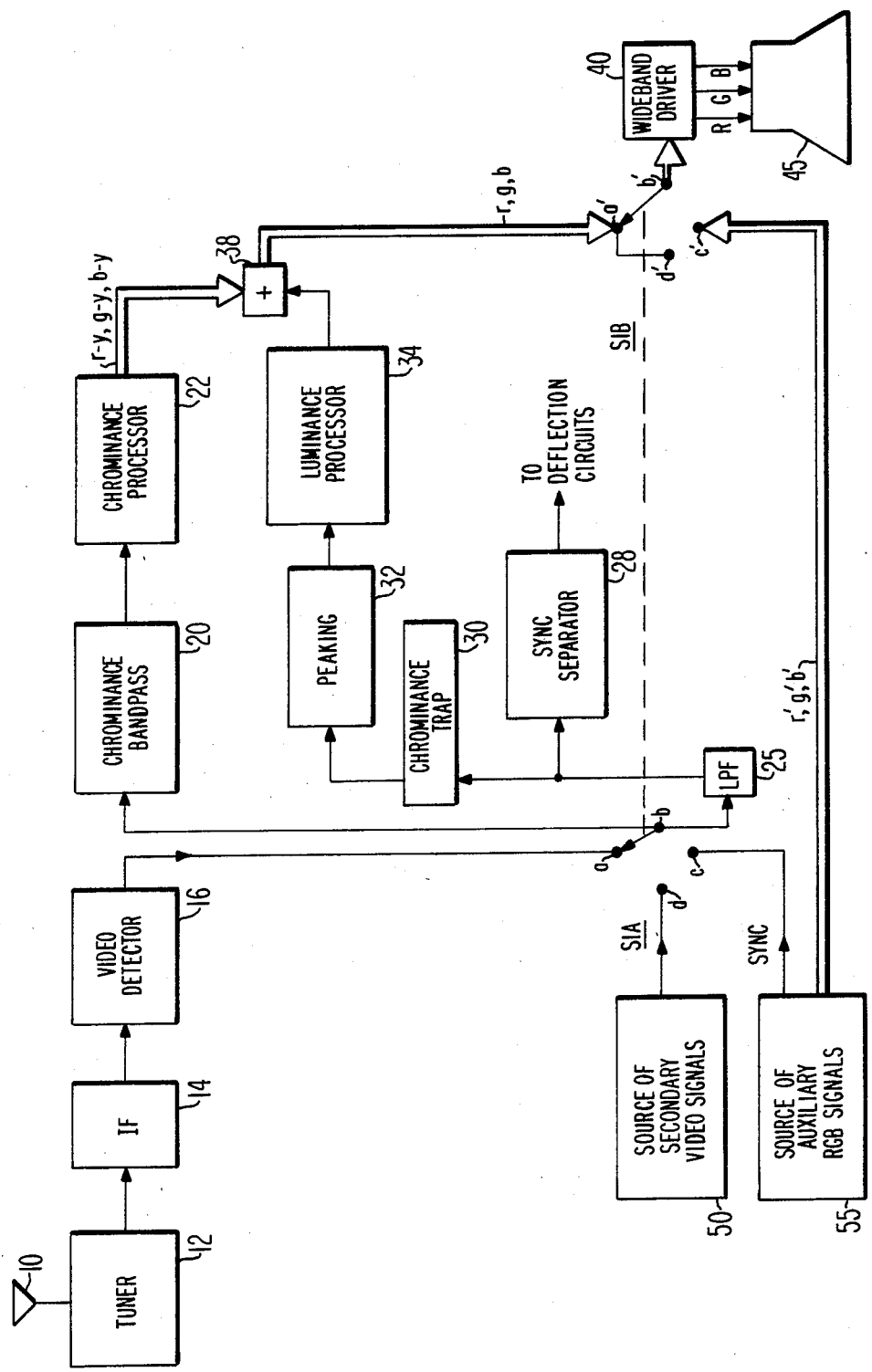

PLURAL INPUT TELEVISION RECEIVER HAVING PEAKING CIRCUIT AND CHROMINANCE BAND REJECT FILTER IN A VIDEO SIGNAL CHANNEL

This invention concerns a television receiver arranged to facilitate the display of both video information derived from received broadcast television signals, and video information associated with auxiliary color image signals.

The bandwidth of a conventional color television signal at baseband frequencies is primarily determined by the bandwidth of the luminance component of the television signal, which in accordance with NTSC broadcast television standards in the United States encompasses signal frequencies of from DC to approximately 4.2 MHz. Substantially the full 4.2 MHz luminance bandwidth is available for signal processing in a color television receiver of the type which employs a comb filter for deriving the luminance and chrominance components from a composite color television signal. However, in a color receiver which does not employ a comb filter the bandwidth of the luminance channel is often limited to approximately 3.0 MHz due to the frequency characteristics of the intermediate frequency (IF) signal processing stage and the filtering characteristics of a chrominance trap at the input of the luminance channel. The luminance signal is often peaked to accentuate the high frequency components thereof, then amplified and combined with the chrominance component to produce color image signals which are applied to an image displaying kinescope via a kinescope driver amplifier stage.

The combination of the kinescope and kinescope driver stage often exhibit a relatively narrow bandwidth of about 2 MHz or somewhat less, due to a low-pass filtering effect produced by the output impedance of the driver stage together with the capacitive load presented by the kinescope signal input (e.g. cathode electrode) to the output of the driver stage. The reduction in video channel bandwidth caused by such a narrowband driver and kinescope combination can be compensated for by high frequency peaking circuits in the luminance channel, thereby resulting in a desired overall video channel bandwidth of approximately 3.0 MHz. However, the processing of a peaked video signal can lead to unwanted effects such as contamination of the chrominance signal with high frequency luminance components, increased noise related artifacts in a displayed picture, and increased likelihood of video regeneration. The latter effect refers to high frequency spectrum video signal components undesirably coupled to luminance and chrominance signal processing circuits such as by means of parasitic capacitances, among other mechanisms.

When a television receiver is intended to offer auxiliary RGB signal input capability, the receiver is typically arranged so that auxiliary red, green and blue color image signals are applied to the kinescope, often directly via the kinescope driver stage, without being subject to the normal signal processing imparted by the luminance and chrominance channels to a received broadcast television signal. The RGB signals may be associated with teletext, video games or computer signal sources, for example. A receiver with RGB input capability preferably should employ a wideband kinescope driver stage in order to achieve better resolution of the information which is commonly associated with such RGB input signals, e.g., alphanumeric characters having fine image detail. Thus, a receiver with auxiliary RGB input signal capability will benefit from a kinescope driver stage with a signal bandwidth of 5 MHz to 8 MHz, for example.

A television receiver with auxiliary RGB input signal capability and a wideband driver stage may, however, exhibit excessive overall bandwidth for normal processing of received broadcast television signals from the antenna input of the receiver through the luminance and chrominance signal processing channels. Specifically, high frequency signal peaking provided by the luminance channel together with a wideband kinescope driver stage can undesirably lead to video output signals with a distorted transient response, as well as a greater chance of video regeneration and high frequency noise contaminating a displayed picture. The likelihood that these unwanted signal conditions will occur complicates the design of a television receiver which is expected to process broadcast television signals most of the time, while occasionally processing auxiliary RGB signal information when available and when selected for viewing by a user. The likelihood of such unwanted conditions occurring is significantly reduced by a television receiver arranged in accordance with the principles of the present invention.

A television receiver in accordance with the present invention includes a video channel with peaking circuits followed by a wideband display driver stage, and is advantageously adapted to facilitate processing either broadcast television signals in a normal operating mode, or other video signals such as RGB signals provided by a computer terminal in an auxiliary mode. In an illustrated embodiment of the invention, a filter restricts the bandwidth of the video channel so that the combination of high frequency peaking circuits within the video channel and the wideband display driver does not result in a condition of excessive bandwidth and attendant unwanted signal conditions. A switching network causes the wideband driver stage to respond to video signals from the video channel in the normal mode, and causes the driver to respond directly to auxiliary video signals in the auxiliary mode. The switching network is additionally arranged so that video input signals from other sources (such as magnetic tape) which are to be processed by the peaked video channel are subjected to filtering by the low-pass filter.

In accordance with an additional feature of the invention, the filter acts on both signals to be processed by the video channel, and signals to be processed by a sync signal separator network of the receiver.

The drawing depicts, in block diagram form, a portion of a color television receiver arranged in accordance with the principles of the present invention.

Broadcast composite color television signals received by an antenna 10 are coupled to a tuner 12 where the received signal is converted to an intermediate frequency (IF) signal. An IF stage 14 amplifies and filters the IF signal. The video component of the output IF signal from IF stage 14 is detected by a video detector 16 which provides an output baseband composite video signal including luminance and chrominance components.

The composite video signal is coupled to a terminal "a" associated with a section S1A of a multi-position, ganged switch S1 which also includes a section S1B as will be discussed. Switch S1 preferably comprises electronic switching elements which may be controlled automatically or manually by a viewer. In a normal operating mode of the receiver, the information associated with detected broadcast television signals, as provided from detector 16, is intended to be displayed by a kinescope of the receiver. The normal receiver operating mode is enabled by switch sections S1A and S1B being in the position illustrated.

In the normal mode the composite video signal is coupled via switch terminals "a" and "b" to a chrominance signal processing channel including an input chrominance bandpass filter 20, and a chrominance signal processor 22 which provides plural output color difference signals r-y, g-y and b-y in known fashion. Chrominance bandpass filter 20 serves to separate the chrominance component from the composite video signal, and exhibits a frequency passband of 3.58 MHz±0.5 MHz at the −3 db points, where the 3.58 MHz center frequency corresponds to the chrominance subcarrier frequency. Bandpass filter 20 is of conventional design and is sometimes referred to as a "chroma peaker".

The composite video signal is also coupled via switch terminal "b" to a low pass filter 25 positioned in accordance with the principles of the present invention. Filter 25 exhibits a passband of from DC to approximately 2.0 MHz in this example. Filter 25 serves to restrict the bandwidth of the luminance signal channel by limiting the high frequency response thereof, as will be explained subsequently.

The filtered composite video signal from filter 25 are applied to a sync separator network 28 for deriving the horizontal (line) and vertical (field) synchronizing (sync) components from the composite video signal. The derived sync components are supplied to sync processing and kinescope deflection control circuits of the receiver (not shown) for synchronizing a displayed image.

The filtered composite video signal from filter 25 are also applied to a luminance channel of the receiver comprising an input chrominance trap 30, peaking circuits 32 and a luminance processor 34. Chrominance trap 30 is of conventional design and serves to remove the 3.58 MHz chrominance subcarrier component from signals being applied to luminance peaking circuits 32. Peaking circuits 32 serve to accentuate high frequency components of the luminance signal, usually with regard to signals in the vicinity of 2.0 MHz, depending on the nature and manner of operation of the peaking circuit. In some receivers the peaking frequency varies with the setting of a viewer adjustable manual peaking control. In many receivers the peaking circuit also advantageously provides phase compensation for IF group delay effects, as well as providing a given amount of luminance signal delay to assist equalizing the luminance and chrominance signal transit times.

Luminance peaking commonly increases the steepness of the slope of the video signal amplitude transitions so as to generate a signal "preshoot" just before an amplitude transition, and a signal "overshoot" just after an amplitude transition. Peaking systems of this type and including both automatic and manual control provisions are described, for example, in U.S. Pat. No. 4,351,003— Harlan and in U.S. Pat. No. 4,388,648— Harwood et al. The peaked luminance signal is afterwards processed by unit 34 which includes amplifier, level shifting, and DC level setting circuits, for example.

An amplified peaked luminance signal from processor 34 is combined in a matrix amplifier 38 with the plural color difference signals from chrominance processor 22 to produce low level red, green and blue color image representative signals r, g and b. These signals are coupled via terminals a' and b' of switch section S1B to a display driver stage 40, which develops high level color image signals R, G and B suitable for driving signal input intensity control electrodes (e.g., cathode electrodes) of a color kinescope 45. Switch section S1B comprises plural ganged sections to accommodate the plural r, g, b signals from matrix 38. These plural switch sections also accommodate plural auxiliary color image signals r', g' and b' from an external auxiliary signal source 55 as will be discussed.

Kinescope driver stage 40 includes plural wideband video output amplifiers respectively associated with each of the r, g and b input signals. The wideband output amplifiers are preferably arranged in a cascode configuration for good high frequency response, and exhibit a frequency bandwidth of from DC to about 5 MHz to 6 MHz, which is a bandwidth about two or three times as wide as that of "narrowband" kinescope driver stages often found in television receivers. The wideband driver stage assists to achieve better resolution of the fine detail information usually associated with alphanumeric character information as determined by auxiliary signals r', g' and b'.

The wideband characteristics of the video output amplifiers in driver stage 40 are determined by several design factors, some of which are mentioned below. The amplifier load resistors are selected to have low values to reduce the low pass filtering effect produced by the load resistors in combination with the kinescope capacitance. Load resistors having inherently low parasitic capacitance are used. Amplifier transistors with good high frequency response are used, and the amplifiers are located close to the kinescope signal input terminals to minimize the amount of parasitic capacitance associated with long connecting wires. Peaking coils in the output circuit of each amplifier also contribute to the wideband response of the amplifiers. One type of wideband kinescope driver stage responsive to auxiliary r, g, b input signals is employed in the CTC-131 color television receiver chassis manufactured by RCA Corporation, as described in the 1984 RCA Color Television Service Data for the CTC-131 receiver.

In an auxiliary operating mode of the receiver, kinescope 45 displays information associated with video signals from either a source 50 or a source 55. Signal source 50 may be, for example, a video cassette recorder. Signals from source 50 are processed in the same manner as discussed previously in connection with broadcast television signals received by antenna 10. In such case, the composite video signal from source 50 is coupled to the luminance and chrominance channels via terminals d and b of switch section S1A, and color image signals are coupled from matrix 38 to driver 40 via terminals a', d' and b' of switch section S1B. It is noted that terminal d' is directly connected to terminal a' at the output of matrix 38.

In a third position of switch S1, in the auxiliary operating mode, an image synchronizing signal (SYNC) from auxiliary signal source 55 is coupled to sync separator 28 of the receiver via switch terminals c and b and low pass filter 25. Red, green and blue auxiliary color image signals r', g' and b' are conveyed directly to respective color signal inputs of display driver 40 via switch terminals c' and b'. The r', g' and b' signals represent alphanumeric character signals which may be provided from a source of teletext signals, a video game apparatus, or a computer. The fine information detail of signals r', g' and b' is preserved by the wideband characteristics of driver 40. The r', g' and b' signals can be applied directly to the signal inputs of driver 40, or to such inputs via suitable interfacing and buffering circuits coupled between the outputs of matrix 38 and driver 40 as shown, for example, in U.S. Pat. No. 4,451,840 of R. L. Shanley, II.

The use of filter 25 in combination with switch S1 advantageously results in a receiver which obtains the full benefit of a wideband display driver stage with respect to auxiliary input color image signals such as r', g' and b', and which also exhibits good overall system bandwidth response for video signals normally processed by the luminance and chrominance channels, without experiencing the signal and display degrading effects of spurious high frequency signal components which are often encountered in television receivers with a wideband display driver stage preceded by a video signal channel including high frequency peaking and amplifying circuits. Thus the use of filter 25 together with switch S1 facilitates the design of a single television receiver chassis which performs well with respect to both broadcast television signals, and auxiliary video signals of the type which typically benefit from wideband signal processing.

Filter 25 essentially corresponds to a low pass filter which is normally coupled to the input of a sync separator network, such as network 28 in the drawing, for the purpose of removing noise components which could disrupt the operation of the sync separator. In the illustrated system, however, the sync separator input filter, i.e., filter 25, has been relocated so that it serves to filter not only sync separator input signals, but also luminance channel input signals. Filter 25 preferably is located in the luminance channel prior to the peaking circuits, but can be located elsewhere in the luminance channel as well.

Filter 25 prevents the bandwidth of the video channel including luminance networks 32 and 34 and wideband display driver 40 from being excessive, thereby reducing the likelihood of undesirable luminance-chrominance "cross-talk" effects, excessive high frequency noise in a displayed image, video regeneration, and distortion of the video signal transient response due to ringing, as discussed below.

Filter 25 attenuates not only the chrominance subcarrier signal at 3.58 MHz, but also the entire chrominance frequency spectrum from 3.08 MHz to 4.08 MHz at the input of the luminance channel, which a conventional narrowband subcarrier trap does not. Thus high frequency chrominance signal components are desirably prevented from being peaked and amplified in the luminance channel. Due to the filtering provided by filter 25 in this respect, chrominance trap 30 may be omitted in some receiver designs. In other receiver designs, however, the presence of chrominance trap 30 may be desirable to provide additional suppression of the chrominance subcarrier. Filter 25 also reduces the likelihood that amplified peaked high frequency luminance signal components will contaminate signals processed by the chrominance channel.

The combination of the high frequency luminance peaking circuits with the wideband display driver stage increases the chance that high frequency noise components will contaminate a displayed picture. The presence of filter 25 helps to prevent this from occurring, as well as preventing noise components from disrupting the operation sync separator 28. Filtering the input signals of sync separator 28 desirably prevents false sync signals from being produced by false triggering of the sync separator by noise signals, which can result in a disrupted sync condition encompassing several horizontal image lines.

The likelihood of video regeneration (a form of unwanted oscillation) occurring increases as high frequency signal components are amplified, e.g., by the combination of high frequency peaking circuits and wideband amplifiers, and is assisted by parasitic capacitance signal coupling paths. Filter 25 reduces the likelihood of video regeneration by reducing the amount of high frequency components that can be amplified by the luminance channel and the display driver stage.

In this system, filter 25 can be a simple first order low pass filter with a −6 db/octave high frequency attenuation characteristic and a cut-off frequency of approximately 2.0 MHz, and peaking circuit 32 accentuates high frequency components in the vicinity of 2.0 MHz. The actual low pass filter design, its cut-off frequency and the peaking frequency range are subject to variation from one receiver design to another depending upon operating parameters such as the amount of peaking desired, for example.

The overall frequency response of the disclosed receiver is approximately 3.0 MHz in the normal operating mode. This response resembles that of a receiver of the type employing a "narrowband" kinescope driver stage which exhibits a low pass filtering effect as mentioned previously. Thus the disclosed receiver arrangement invites comparison with a conventional receiver of the "narrowband" driver type. In the latter case the overall video signal processing bandwidth (e.g., approximately 3.0 MHz) is determined in part by the low pass filtering effect produced by the narrowband display driver stage. In the disclosed receiver arrangement the narrowband driver has been replaced by a wideband driver stage to facilitate the display of auxiliary RGB information, and the overall normal video signal processing bandwidth is determined in part by the low pass filtering effect of filter 25 which is advantageously located prior to the peaking circuits as has been explained.

What is claimed is:

1. A video signal processing and display system including a video signal processing channel and an image display device responsive to video signals applied thereto, said system comprising:
   a first input for receiving a first video signal, comprising luminance and chrominance components, containing image information to be displayed;
   peaking means included in said video channel for accentuating high-frequency video signal components;
   filter means, having a cut-off frequency below a band of frequencies occupied by said chrominance component, included in said video channel for attenuating high frequency components of a video signal subject to processing by said video channel, thereby causing said video channel to exhibit a restricted signal bandwidth;
   display driver amplifier means for providing an amplified video signal to a signal input of said display device, said driver means exhibiting a signal bandwidth wider than said restricted bandwidth of said video channel;

a second input for receiving a second, auxiliary, video signal containing information to be displayed; and switch means for (a) enabling said first video signal from said first input to be coupled to said display device via said filter means, said peaking means and said driver means in a normal operating mode of said system; and (b) enabling said auxiliary video signal from said second input to be coupled to said display device via said driver means exclusive of said filter means and said peaking means in auxiliary operating mode of said system.

2. A system according to claim 1, wherein said filter means in a low pass filter.

3. A system according to claim 1, wherein said first video signal is a luminance signal subject to processing by said video channel.

4. A system according to claim 1, wherein said filter means precedes said peaking means in said video channel.

5. A receiver according to claim 4, wherein, said filter means precedes said peaking means in said video channel.

6. A television receiver including a video signal processing channel and an image display device responsive to video signals applied thereto, said receiver comprising:

a first input for receiving a first video signal, comprising luminance and chrominance components, containing image information to be displayed and image synchronizing signal components;

filter means, having a cut-off frequency below a band of frequencies occupied by said chrominance component, included in said video channel for attenuating high frequency components of a video signal subject to processing by said video channel, thereby causing said video channel to exhibit a restricted signal bandwidth;

synchronizing signal separator means responsive to a filtered video signal for said filter means;

display driver amplifier means for providing an amplified video signal to a signal input of said display device, said driver means exhibiting a signal bandwidth wider than said restricted bandwidth of said video channel;

a second input for receiving a second, auxiliary, video signal containing information to be displayed;

a third input for receiving image synchronizing signals for synchronizing the display of images associated with said auxiliary video signal; and switch means for (a) enabling said first video signal from said first input to be coupled to said display device via said filter means, said peaking means and said driver means in a normal operating mode of said receiver; and (b) enabling said auxiliary video signal from said second input to be coupled to said display device via said driver means exclusive of said filter means and said peaking means in an auxiliary operating mode of said receiver.

7. A receiver according to claim 6, wherein said filter means is a low-pass filter; and said first video signal is a luminance signal subject to processing by said video channel.

8. A receiver according to claim 6, wherein said switch means enables said image synchronizing signals associated with said third input to be filtered by said filter means in said auxiliary operating mode.

9. A receiver according to claim 6, wherein said first video signal of said first input is a broadcast television signal received by said receiver.

* * * * *